United States Patent
De Bie

[15] 3,656,617
[45] Apr. 18, 1972

[54] DEVICE FOR MANIPULATING COPPER BARS

[72] Inventor: Edouard De Bie, Antwerp, Belgium
[73] Assignee: Metallurgie Hoboken, Brussels, Belgium
[22] Filed: Oct. 20, 1969
[21] Appl. No.: 872,438

[30] Foreign Application Priority Data
Oct. 28, 1968 Belgium..................................65303

[52] U.S. Cl.............................................209/122, 198/219
[51] Int. Cl.......................................................B07c 7/00
[58] Field of Search......................209/125, 123, 74, 73, 122; 198/33, 219; 193/36

[56] References Cited

UNITED STATES PATENTS

| | | | |
|---|---|---|---|
| 2,360,661 | 10/1944 | Eddy et al..............................193/36 |
| 2,754,964 | 7/1956 | Muller....................................209/123 |
| 2,822,930 | 2/1958 | MacGregor et al.................198/33.4 X |
| 2,837,200 | 6/1958 | Evans...................................198/33.4 |

Primary Examiner—Allen N. Knowles
Attorney—Irving M. Weiner

[57] ABSTRACT

An apparatus for manipulating bars so that each face of the bar may be inspected for faults. The apparatus has a conveyor to feed a bar to an inspection table which houses angle iron members at each inspection station along the table. The angle irons engage a bar, lift it from the table, rotate it to expose its next face to inspection, and deposit it at the next inspection station. A tray is located at the end of the inspection table for unloading an inspected bar. The last angle iron deposits an inspected bar on the tray. The tray lifts the inspected bar and deposits it either on a conveyor for accepted bars, or on another conveyor for rejected bars. The unloading conveyors abut the outlet end of the table. The end segment of one conveyor is mounted to move in upward and downward directions relative to the table. When the inspected bar is to travel along this conveyor, the segment is in its downward position abutting the end of the table, and the tray will deposit the inspected bar on this conveyor. When the inspected bar is to travel along the other conveyor, the segment of the first conveyor is raised upward out of contact with the table to supply clearance for allowing the tray to deposit the inspected bar on the other conveyor.

10 Claims, 6 Drawing Figures

DEVICE FOR MANIPULATING COPPER BARS

This invention relates to a device for mechanically manipulating copper bars having a trapezoidal section ("wirebars") for inspection of each face of the bar, correcting if necessary faults detected by the inspection, and sending the inspected bars to their final destination, either as accepted bars, or as refused bars, or as bars to be submitted to a finishing operation or to be kept in reserve because of a weight which does not agree with the specification asked for.

In the ordinary practice, wirebars are produced by melting copper cathodes or scrap copper sufficiently pure in a furnace, which may be a reverberatory furnace or a vertical furnace, and the molten copper is cast into molds arranged upon a casting machine or "carrousel." In order to remove the bars from the mould and cool them, the molds are tilted so that the solidified bars shall fall into a pit filled with water from which the bars are taken out by a conveyor which brings them one after the other upon a bench, or table, from which they are removed for instance by a lifting device or by a crane, or upon a roller conveyor. Whichever the means for removing the bars, the later are brought finally upon a fixed inspection bench from which they are turned manually over upon each face successively one by one to be inspected, and if necessary corrected, and afterwards sorted.

One of the advantages of the present invention resides in a great saving of manpower.

Another advantage is effecting a more rapid operation giving an improved output for the inspection operation.

The invention consists in a apparatus by which the bars (wirebars) are displaced to be turned over mechanically one by one upon each of their faces successively, and which removes the bars whilst sorting them one by one either as a satisfactory bar or as a refused bar, or as a bar to be kept in reserve for another class as to weight, or to be improved, means being provided for carrying each bar individually to a point where means comprising pivoting angle irons turn the bar over successively on each of its faces and present successively each face to inspection so as to be able to make the required modifications before the bar is sent away to be sorted.

According to another characteristic feature of the invention, a separate set of pivoting angle irons is provided for each face of the copper bar.

A movable tray is advantageously provided serving to remove the last bar inspected from the last set of pivoting angle irons and to place it upon devices which direct the accepted bars in one direction, and the bars refused or to be kept in reserve in another direction.

An electro-hydraulic valve is advantageously provided, acting through the intermediary of one or several hydraulic cylinders to raise and lower a frame serving to lift and to lower the bars through the intermediary of sets of angle irons. Another electro-hydraulic valve serves to actuate the movable tray and the pivoting angle irons.

Still another electro-hydraulic valve is advantageously provided for ensuring the movement of a roller conveyor which serves to send the bars away to be sorted.

The invention will be now more particularly described with reference to the accompanying drawings in which.

Figure 1:
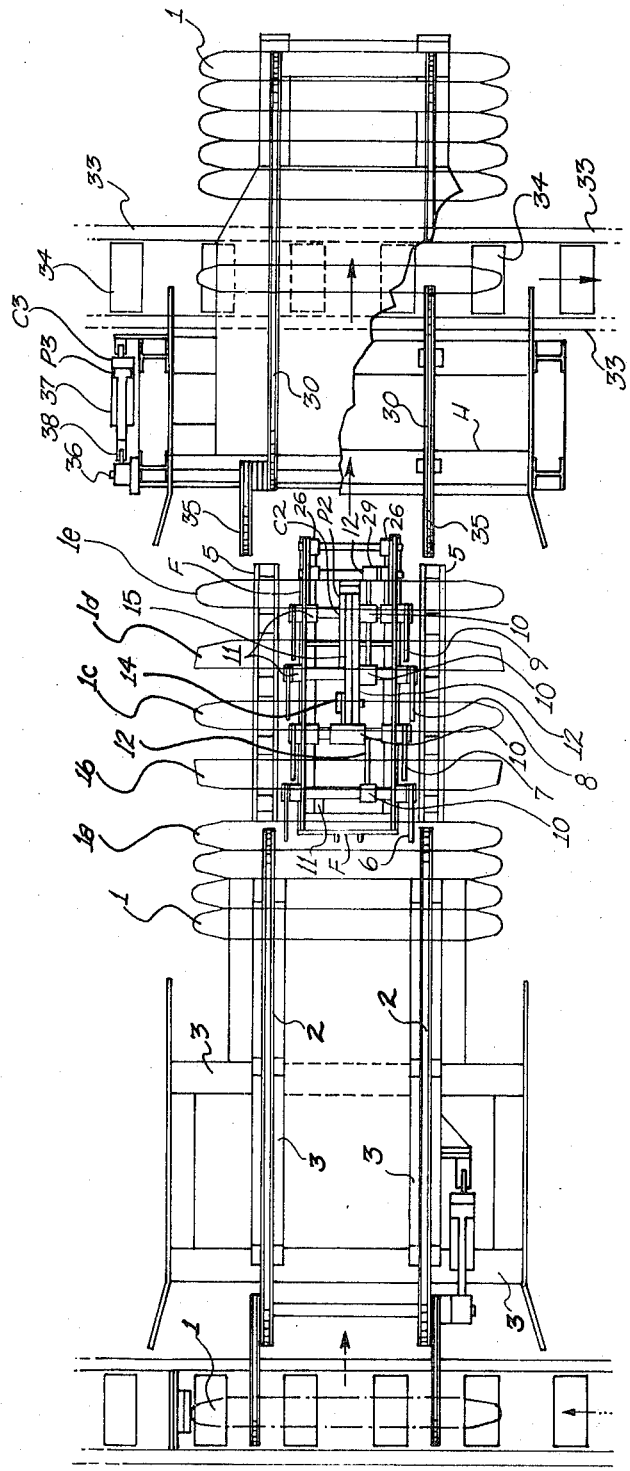
FIG. 1 is a plan view of the plant serving to turn the bars over and to send them away.
Figure 2:
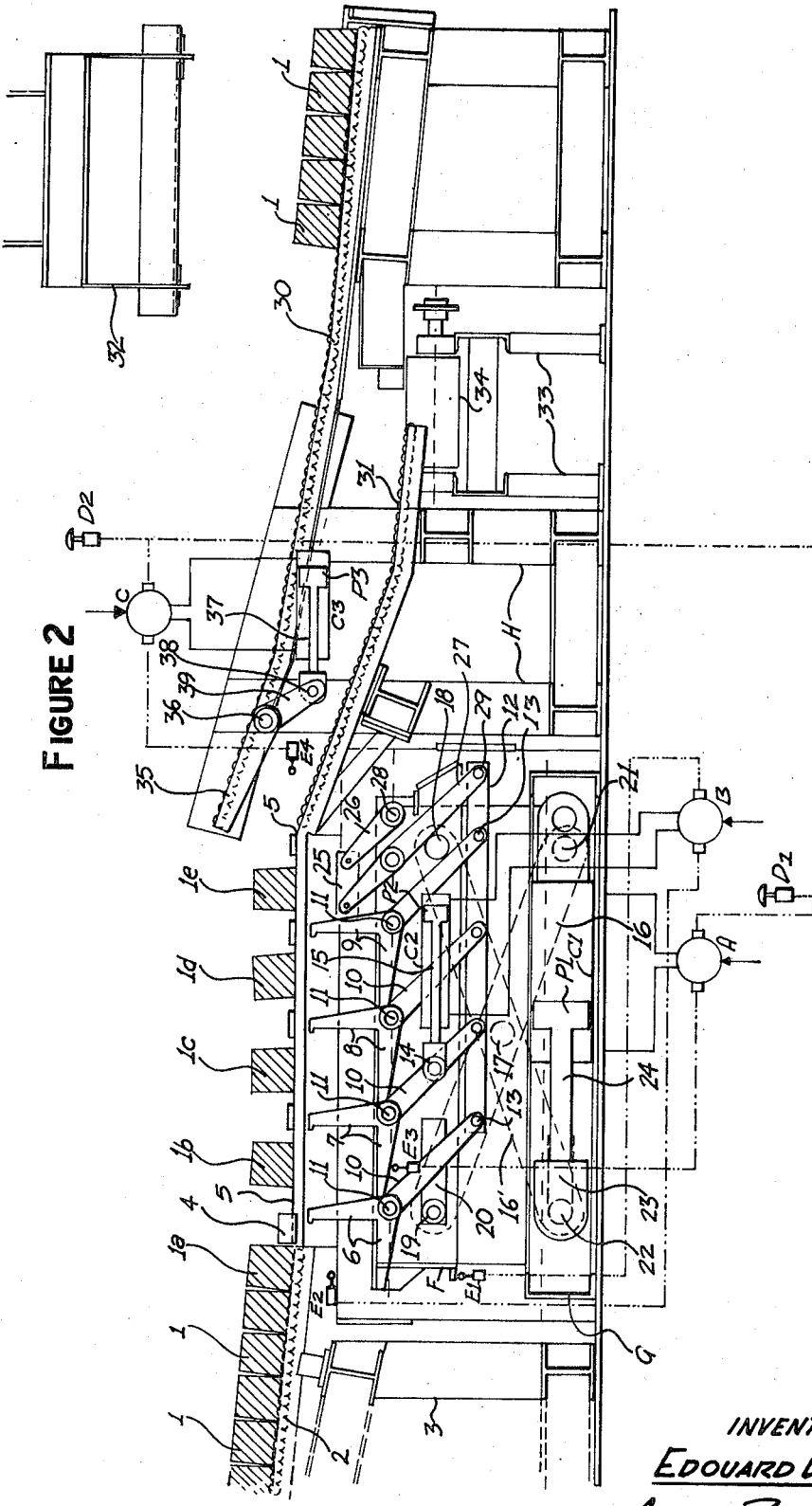
FIG. 2 is a view in section of the said plant serving to turn the bars over and to send them away, such plant being shown in a fixed position.
Figure 3:
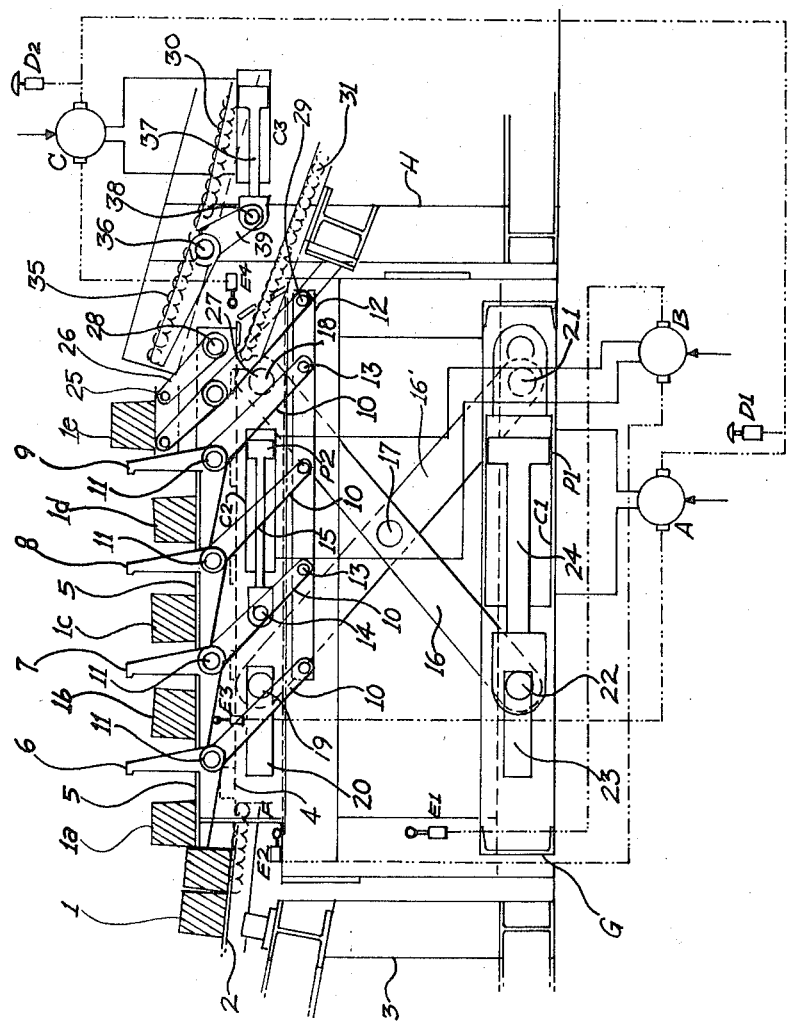
FIG. 3 is a view in section of the plant for turning the bars over and of the device for sending them away after the angle irons have lifted the bars.
Figure 4:
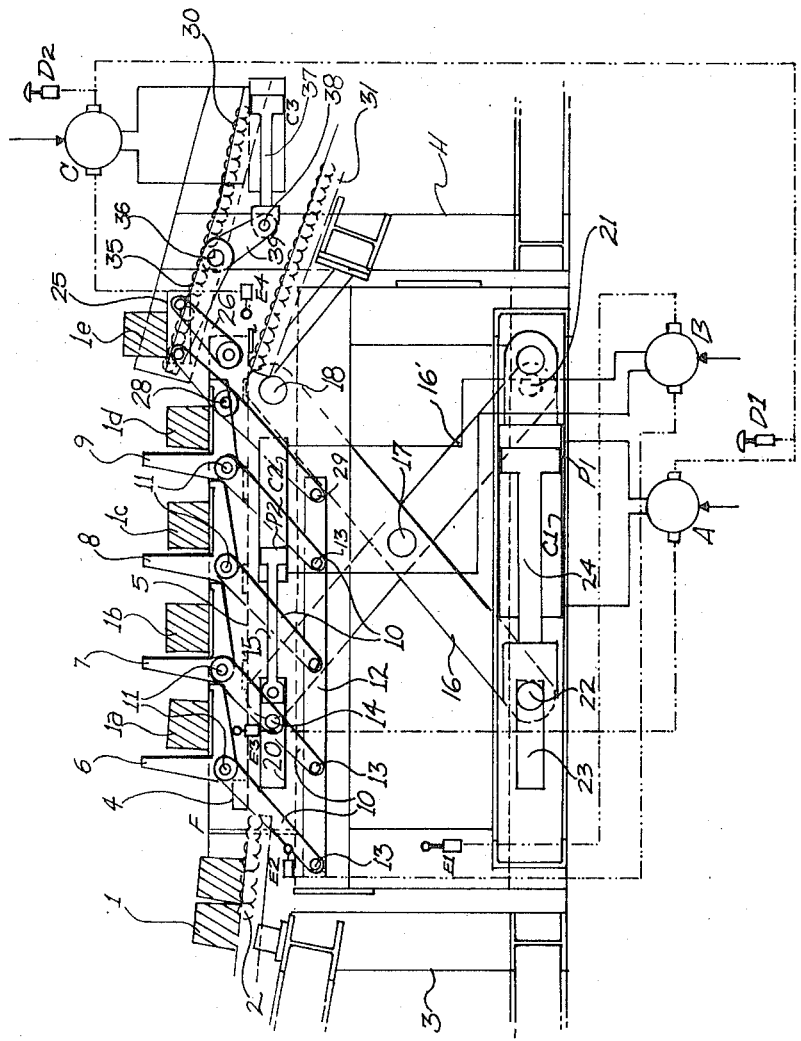
FIG. 4 is a view in section of the plant for turning the bars over and of the conveying device, angle irons for turning over of the bar having pivoted the bar through 90° to present another face of the bar upwards.

FIGS. 1 and 2 illustrate the wirebars 1 obtained in casting apparatus situated upstream and not illustrated, the said wirebars being arranged one behind the other, upon an inclined plane 2 formed by two roller paths and supported by a frame 3.

A first bar 1a is stopped at the foot of the inclined plane 2 by a stop block or notched tooth 4 fixed at the inlet end of an inspection table 5 formed by fixed girders upon which bars are placed which must be turned over four times successively to be examined upon each of their faces.

The bars are brought and turned over upon the table 5 by means of four sets of angle irons 6, 7, 8, 9, the angle irons of each set being connected to each other by means of linked crossbars 11, actuated by levers 10 ensuring a pivoting of the angle irons around the linked crossbars 11 which are fixed to a frame F. The levers 10 are connected together by means of rods 12 linked at 13 upon the levers 10. The pivoting of the sets of angle irons 6, 7, 8, 9 is ensured by a piston P2 which is displaced in a hydraulic cylinder C2 fixed to the frame F, and a rod 15 is connected to the lever 10 of the set of angle irons 7 by means of a link 14. The frame F, in which the cylinder C2 and the sets of angle irons are fixed, is subjected to an upward and downward movement through the action of arms 16 and 16', of a set of spiders linked around a crossbar 17.

The upper ends of the arms 16 and 16' of said spiders are connected to the frame F by a linked bar 18 and a stud 19 which is displaced in button holes 20 drilled in the frame F. The lower ends of the branches 16 and 16' of the said spider are connected to a base or frame G fixed to the ground by a linked crossbar 21 and by a stud 22 which is displaced in buttonholes 23 drilled in the frame G.

The upward and downward movements of the spider are ensured by a piston P1 which is displaced in the cylinder C1 fixed to the frame G, and by the end of a piston rod 24 which is connected with the stud 22 which is displaced in the buttonholes 23.

The removal of the last bar inspected, 1e, is ensured by a movable tray 25 connected to the frame F by means of two parallel levers 26 and 27.

The lever 27 pivots around a pivot 28 fixed in the frame F and is connected by a link 29 with the rods 12. Under the action of the piston P2 of the cylinder C2 and through the intermediary of the link 14 fixed to the lever 10 of the set of angle irons 7, cooperating with the rods 12 and with the levers 26 and 27, the tray 25 is able to move upwards when displaced to the right in order to lay the bar 1e upon one of the rolling tracks 30 and 31 for the removal of bars, or it may be lowered by moving to the left to find again its initial position.

The bars 1e which are accepted at the inspection, are laid by the movable tray 25 upon the inclined plane 30 formed by two roller tracks, at the foot of which they are retaken periodically by a crane jib 32 or by any other means such as lifting apparatus.

The bars 1e which have been refused at the inspection, or have been placed in reserve to be corrected, or which correspond to another class of weight, are deposited by means of the movable tray 25, upon a lower inclined plane 31 also formed by two roller tracks in connection with a conveyer 33 having rollers 34 placed at the foot of the inclined plane 31. The said bars are sent to the corresponding collecting tables (not illustrated).

Figure 5:
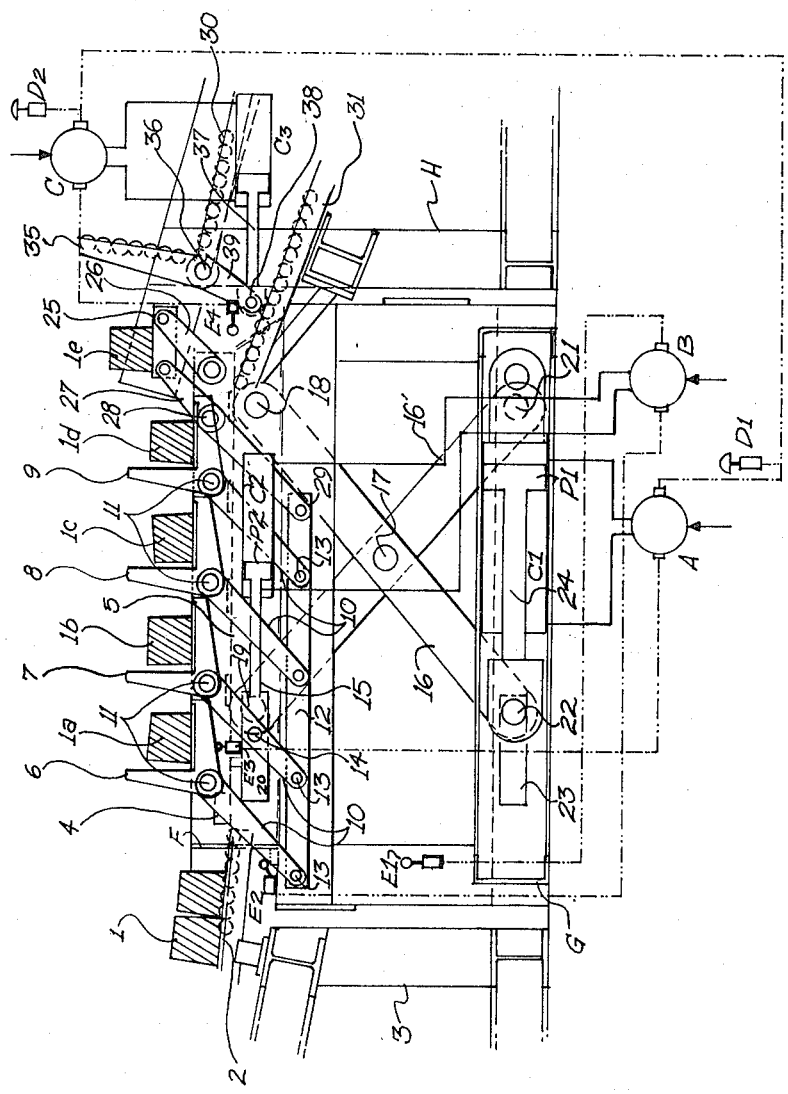
FIG. 5 is similar to FIG. 4, the conveying device being place in a position permitting to by-pass the bars which are refused or kept in reserve.

In order to allow the tray 25 to lay a refused bar 1e upon the inclined plane 31, an element 35 of the inclined plane 30 pivots in a vertical position around a link 36 as shown in FIG. 5, under the action of a piston P3 of the cylinder C3 the rod 37 of which is linked at 38 to a lever 39 of the member 35. The cylinder C3 is fixed to a frame H which also supports the two inclined planes 30 and 31.

The invention will be now explained as to the working of the apparatus.

In FIGS. 2 to 6 an electro-hydraulic valve A has been shown which, through the intermediary of the hydraulic cylinder C1, ensures the upward and downward movements of the frame F, an electro-hydraulic valve B which through the intermediary of the cylinder C2 ensures the rotations of the sets of angle irons 6, 7, 8, 9 and the displacement of the movable tray 25, and an electro-hydraulic valve C which through the intermediary of the cylinder C3 ensures a pivoting of the element 35 of the inclined plane 30.

The full lines connecting the said valves to their respective cylinders represent the hydraulic circuit; the dotted lines represent the electrical connections.

In FIG. 2, the frame F is situated in its lower position, and the angle irons 6, 7, 8, 9 are shown below the inspection table 5.

By acting manually upon the push button D1, the operator acts through the intermdiary of the valve A upon the front face of the piston P1 of the cylinder C1 which, by bringing the ends of the spiders 16 and 16' nearer, ensures an upward movement of the frame F.

In its raised position (FIG. 3) the frame F, by means of the set of angle irons 6, 7, 8, 9 and the movable tray 25, lifts the bar 1a which is still upon the inclined plane 2 and bears against the notched tooth 4, and the bars 1b, 1c, 1d, 1e, above the inspection table 5.

The frame F actuates at the same time a contact E2 which actuates the cylinder C2 through the intermediary of a valve B.

The cylinder C2 mounted on the frame F ensures (FIG. 4) the turning over of the wirebars 1a - 1b - 1c - 1d and the removal of the bar 1e through the intermediary of the levers 10 and of the sets of angle irons 6, 7, 8, 9 which effects a pivoting of the bars 1a, to 1d through 90° and through the intermediary of the levers 27 and 26 and of the tray 25 which displace the bar 1e towards two roller tracks of the inclined planes 30 and 31.

When pivoting, one of the angle irons (for instance the angle iron 6 in FIG. 4) actuates the contact E3 which actuates through the intermediary of the valve A, the cylinder C1 which actuates the downward movement of the frame F.

During the downward movement of the frame F, the bars 1a, 1b, 1c, 1d which are situated upon the sets of angle irons 6, 7, 8, 9 are laid upon the table 5 for inspection of another face of the bar (FIG. 5), and the bar 1e, which is situated upon the movable tray 25, is laid either upon the roller track 30 and the element 35 for bars which are satisfactory (FIG. 4), or on the roller track 31 for the bars which belong to another class of weight or which have been refused (FIG. 5), according as the roller element 35 is situated in a horizontal position (FIG. 4) or in a vertical position (FIG. 5).

The element 35 is actuated by means of the cylinders C3 and through the intermediary of the electro-hydraulic valve C.

The placing in a vertical position is obtained by a push button D2, thus permitting to choose the direction in which the bar is sent, according as the inspector considers it as being satisfactory or to be refused, or to be kept in reserve for improvement or as belonging to another class of weight.

The return of the element 35 to a horizontal position is automatically carried out by a switch E4 actuated by the bar 1e which is considered as to be refused and is removed by the roller track 31 (FIG. 5).

Figure 6:
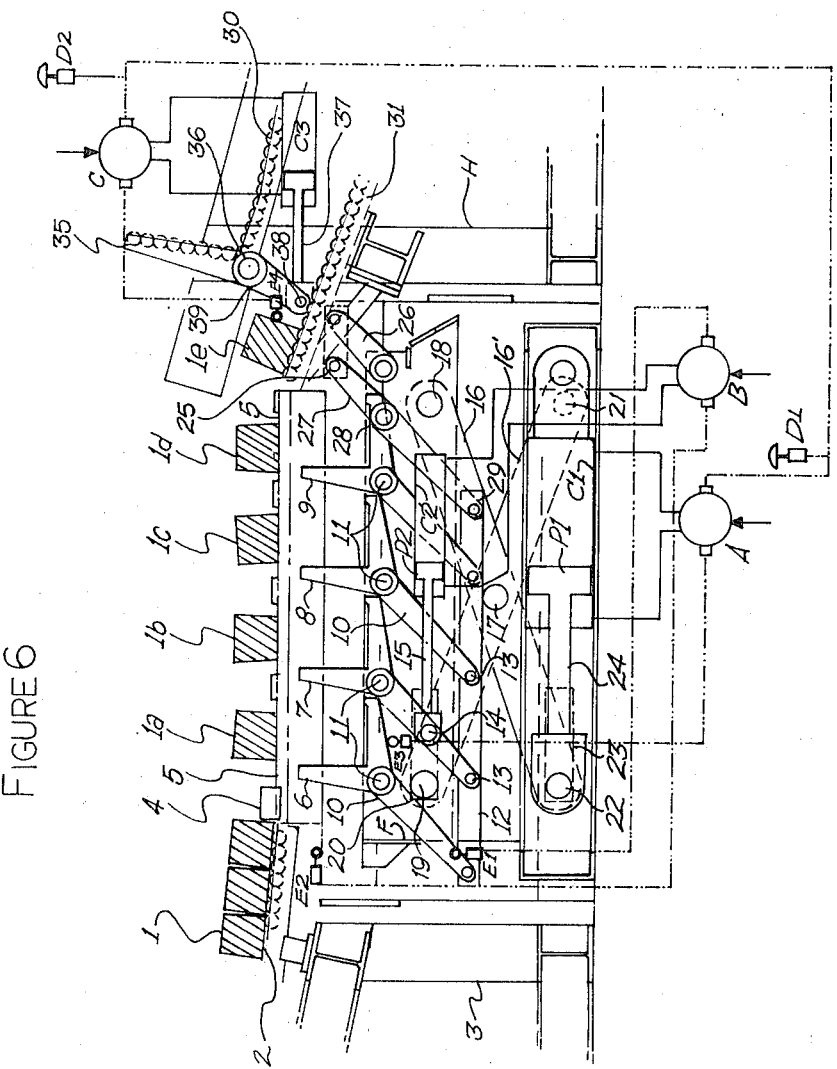
FIG. 6 is a view in section of the means serving to turn the bars over, the angle irons for the turning over being lowered after they have placed upon the inspection table the bars which another face upwards, ready for inspection.

At its lower position (FIG. 6) the frame F touches the contact E1 which effects a rotation of the members G and H, carried out under the effect of the cylinder C2 through the intermediary of the valve B (FIG. 5 and 6).

The apparatus is thus returned to its initial position shown in FIG. 1, and is ready for a new cycle which the operator starts by operating the push button D1, after having inspected and corrected the faces of the bars placed upon the table 5.

What I claim is:

1. An apparatus to mechanically manipulate bars for inspection and correction of each face of each bar, which comprises:
   means to carry each bar individually to an inlet end of an inspection table;
   a plurality of pivoting angle irons positioned at spaced intervals along said inspection table to lift and rotate said bar successively on each of its faces, for inspection and correction of a fault in said face, and to advance said bar progressively along said table from one angle iron to the next succeeding angle iron; and
   means to lift and rotate said pivoting angle irons.

2. An apparatus to mechanically manipulate bars, substantially as set forth in claim 1, wherein said means to carry each bar individually to an inlet end of an inspection table comprises:
   a conveyor means, one end of which is contiguous to said inlet end of said inspection table; and
   a stop block disposed upon and positioned at said inlet end of said table to locate the bar over one of said angle irons.

3. An apparatus to mechanically manipulate bars for inspection and correction substantially as set forth in claim 1, wherein:
   said plurality of pivoting angle irons have two legs disposed substantially at right angles to each other;
   at least one frame adapted for upward and downward movement, and each of said angle irons is pivotally connected to said frame;
   at least one rod affixed to said frame mounted for longitudinal movement;
   a plurality of levers each of which is connected at one end to one of said angle irons, and pivotally connected at its opposite end to said rod;
   means to move said rod longitudinally to effect rotation of said angle irons; and
   means to move said frame upwardly and downwardly to effect an upward and downward movement of said angle irons.

4. An apparatus to mechanically manipulate bars for inspection, substantially as set forth in claim 3, further characterized in that each of said angle irons is adapted to rotate 90° from its initial position for rotating a bar of substantially rectangular cross-section successively on each of its faces.

5. An apparatus to mechanically manipulate bars for inspection, substantially as set forth in claim 1, further characterized in that:
   at least one of said pivoting angle irons is provided for each face of said bar to allow inspection of one face of said bar at a time; and
   said angle irons are spaced along said inspection table to allow said angle iron to deposit said bars in a position to be next engaged by the next succeeding angle iron and progressively transfer said wire bar the length of said inspection table.

6. An apparatus to mechanically manipulate bars for inspection, substantially as set forth in claim 1, further characterized in having:
   a conveyor means located contiguous to an outlet end of said inspection table to direct accepted bars in one direction, and rejected bars in another direction; and
   at least one tray mounted for arcuate motion disposed at the outlet end of said inspection table to lift said bars from said inspection table and to deposit them on said conveyor means.

7. An apparatus to mechanically manipulate bars for inspection, substantially as set forth in claim 3, further characterized in having:
   a tray disposed at an outlet end of said inspection table to receive bars from a last of said plurality of angle irons; and
   at least one lever connected at its opposite ends to both said tray and said rod, and pivotally connected between its ends to said frame to cause said tray to move in an arcuate motion when said rod moves longitudinally.

8. An apparatus to mechanically manipulate bars for inspection, substantially as set forth in claim 7, further characterized in having:
   at least two conveyors disposed one above the other, located contiguous to said outlet end of said inspection table; and a movable portion of an uppermost conveyor being mounted for arcuate motion in generally upward and downward directions to allow accepted bars received from said tray to be directed along said uppermost conveyor when said movable portion is in its lowest position, and to displace said uppermost conveyor generally upwardly out of contiguity with said inspection table to direct a rejected bar in a manner to bypass said uppermost conveyor and be directed along a lower conveyor.

9. An apparatus to mechanically manipulate bars for inspection, substantially as set forth in claim 3, further characterized in that:

said means to move said rod longitudinally includes an electro-hydraulic valve acting through the intermediary of at least one hydraulic cylinder; and said means to move said frame upwardly and downwardly includes an electro-hydraulic valve acting through the intermediary of at least one hydraulic cylinder.

10. An apparatus to mechanically manipulate bars for inspection, substantially as set forth in claim 8, further characterized in having:

at least one lever operatively associated at its opposite ends to said movable portion of said uppermost conveyor and a hydraulic cylinder;

said hydraulic cylinder being activated through an electro-hydraulic valve, raises and lowers said uppermost conveyor as required to direct said bars along one of said conveyors.

* * * * *